June 13, 1933.　　　J. BIJUR　　　1,913,366
LUBRICATION
Filed Sept. 14, 1925　　5 Sheets-Sheet 1

Inventor
Joseph Bijur
By his Attorneys
Dean, Fairbank, Obrieght & Hirsch

June 13, 1933.     J. BIJUR     1,913,366
LUBRICATION
Filed Sept. 14, 1925     5 Sheets-Sheet 2

Inventor
Joseph Bijur
By his Attorneys
Dean, Fairbank, Obright & Hirsch

June 13, 1933.  J. BIJUR  1,913,366
LUBRICATION
Filed Sept. 14, 1925   5 Sheets-Sheet 3

Inventor
Joseph Bijur
By his Attorneys
Dean, Fairbank, Obrieght & Hirsch

Patented June 13, 1933

1,913,366

UNITED STATES PATENT OFFICE

JOSEPH BIJUR, OF NEW YORK, N. Y., ASSIGNOR TO AUTO RESEARCH CORPORATION, A CORPORATION OF DELAWARE

LUBRICATION

Application filed September 14, 1925. Serial No. 56,148.

My present invention is concerned with gravity flow lubricant distributing systems and has a preferred application in association with pressure lubricating systems, more particularly for delivering lubricant by gravity flow from a pressure line to the bearing or bearings of a structure having a swiveled or other movable connection to the structure carrying the pressure line, and especially where it is undesirable to convey the lubricant under pressure past or across such swivel.

The invention has a preferred application to the lubrication of the steering knuckles of a motor vehicle, the broad object of delivering lubricant reliably to various knuckle bearings, and without the need for selective manipulation, nor the use of auxiliary swivels or of flapping conduits or other parts likely to become damaged in use, and which will, moreover, preclude the entry of dust to the bearing surfaces.

The invention is concerned largely with, though not limited to, Elliott axles, that is, to axles with clevises straddling the knuckles.

The present invention in one form is concerned with an unobstructed piping or conduit system carried by the knuckles, and specially constructed and arranged to pass lubricant therethrough by gravity flow without air blocking or siphoning, even though the system be unvented or any vent thereto be closed as by reason of the dust-proofing of the swivel, across which is to flow the lubricant admitted from the pressure line carried on the axle.

In the reverse Elliott axle, in which a clevis on the knuckle straddles the end of the axle beam, where the lubricant is admitted at a part rigid with the axle such lubricant may be conveyed to the conduit system of the knuckle by flow through a port in or above the upper bushing of the knuckle bearing about the king pin. In an embodiment of the present invention where the Elliott axle is utilized, lubricant is admitted to the straddling axle clevis and flows to the piping system on the knuckle transversely across the swivel between the upper face of the knuckle and the contiguous face of the upper axle clevis jaw. Where the upper clevis jaw of the axle bears upon the top of the knuckle, the interposed thrust bearing may constitute such swivel. To preclude the entry of dust or dirt to the piping system through said swivel or thrust bearing, the same may be made dust-proof preferably by an encircling downwardly protruding annulus, permitting the free swiveling movement of the knuckle. The dust-proofing arrangement frequently will seal any vent through which air might enter the knuckle conduit system, so that the knuckle piping principle here employed is relied on to prevent air-blocking and siphoning.

In one general type of construction, all of the lubricant is admitted into the upper part of the swivel or thrust bearing structure and excess beyond the requirements thereof drains from the lower part thereof into the knuckle piping system.

In another type of embodiment, lubricant is admitted directly to the knuckle pipe system by flow transversely across the thrust bearing, through a port that permits some lateral drainage therefrom to the thrust bearing surface.

The passage across the thrust bearing may extend through the bearing surface thereof or in the alternative, the knuckle supplying bore may extend longitudinally for instance, through the king pin across the thrust bearing, free from contact with the bearing surface thereof, a radial bore through the king pin admitting part of the lubricant into the thrust bearing.

In a desirable embodiment, a king pin bore may deliver lubricant through a locking pin therefor, which in that case, would be formed with a lubricant-tight abutment in a corresponding socket laterally of the king pin, said locking pin preferably affording also a mount for the upper or inlet end of the piping system on the knuckle.

In a type of knuckle construction in which the king pin is rigidly affixed in the axle clevis, the bearing bushings being in the knuckle therebetween, lubricant fed to the knuckle across the thrust bearing may pass into a bore in the knuckle structure, provided with a lateral outlet from which the upper bushing receives some of the lubricant, the rest passing from the bore to the piping system on the knuckle.

In another embodiment of the latter type, lubricant admitted axially into the top of the king pin may be fed laterally outward therefrom about the outside thereof, past the upper bushing, and a baffle plate press-fitted into the knuckle bore between the two bushings may intercept excess lubricant from the bushing and direct it into a lateral bore in the knuckle for delivery to the knuckle piping system.

In the accompanying drawings in which are shown one or more of various possible embodiments of the several features of the invention.

Figures 1, 2, 3:
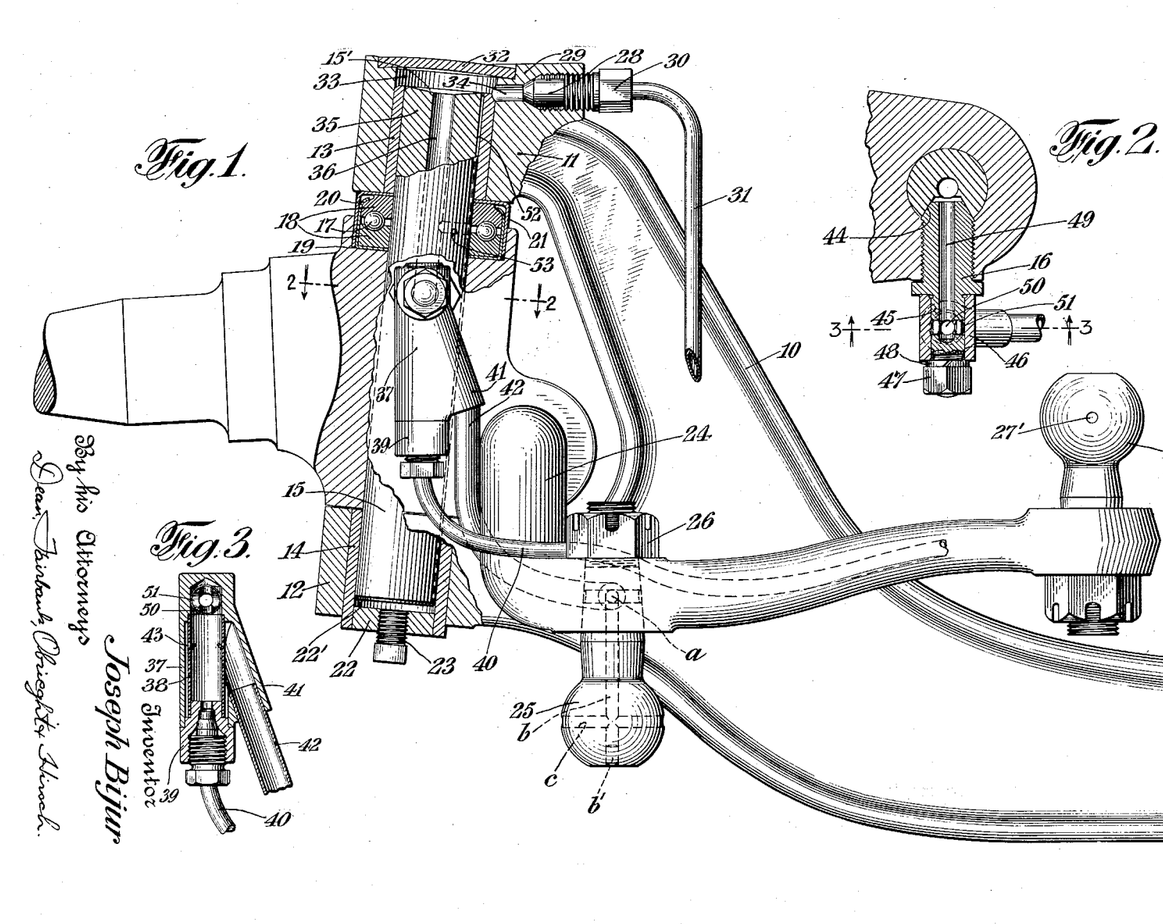
Fig. 1 is a view partly in elevation and partly in longitudinal section of one embodiment.
Fig. 2 is a transverse sectional view taken along the line 2—2 of Fig. 1.
Fig. 3 is a sectional view taken along the line 3—3 of Fig. 2.

Referring now to Figs. 1, 2 and 3 of the drawings, I have shown a knuckle construction comprising an axle 10 having an upper clevis jaw 11 and a lower clevis jaw 12 within which are press-fitted respectively bushings 13 and 14 constituting bearings for the ends of a king pin 15, which is locked into the knuckle by lock plug 16. The thrust of the axle is borne by a ball thrust bearing 17 fitting in a corresponding socket in the upper face of the knuckle and sustaining the lower face of the upper clevis jaw. The two races 18 for the balls are maintained assembled by the metal cup 19, the rim of which is clenched inward at 20. A sheet metal cover member 21 telescoped over cup 19 extends into the knuckle socket and maintains the thrust bearing substantially dust-proof. The lower end of the lower bushing 14 is closed by a press-fitted plug 22, a central aperture in which is closed by a screw plug 23, removable for access of an appropriate tool to effect driving out of the king pin in disassembly. The knuckle has keyed thereto an arm 24 intermediate the ends of which there is mounted a tie rod ball pivot stud 25 with its ball head extending downward therefrom and maintained in place with a taper fit by a nut 26. At the extreme outer end of the arm, the drag link pivot stud 27 is mounted in manner similar to the tie rod bearing stud, the ball extending upward.

For lubricating the construction of the knuckle, which as thus far described in its general outline is well known, I have provided a construction and arrangement of parts now to be described. Lubricant is admitted through a drip plug 28 fitting in a corresponding socket 29 formed at the upper clevis jaw of the axle construction and maintained in position therein by a bushing 30, which clamps in position the inlet pipe 31 through which lubricant is supplied from a central system on the chassis frame. The drip plug may be of the construction shown in the copending application of Edward H. Kocher, Serial No. 22,104 filed April 10th, 1925. The upper end of the upper clevis jaw is closed by a press-fitted cover 32 determining a well or cavity 33 therebelow, which is supplied through a communicating bore 34 from the drip plug. The upper end of the king pin is formed with a well 15', so that lubricant from the well will drain through a relatively large bore 36 axially of the king pin extending down to and below the thrust bearing 17. The lubricant thus delivered into the bore is delivered through a piping system of construction which may be generically the same as that disclosed in my copending application, Serial No. 39,415 filed June 25, 1925. For this purpose, I provide a dividing fitting generally similar to that disclosed in my said copending application and separately shown in Fig. 3, which dividing fitting need, therefore, not be described in detail. Said fitting, it may be briefly noted, comprises a casting or forging 37 having a pipe 38, longitudinally of its main bore, which communicates through an outlet 39 with a pipe 40, leading to the drag link bearing 27. The fitting also has a branch 41 in which is fitted a pipe 42 of larger diameter leading to the tie rod bearing 25, said branch supplied with lubricant trickling through lateral openings 43 in the wall of pipe 38.

In the present embodiment, the king pin locking plug 16 serves for mounting the dividing fitting and for conveying the lubricant thereto. To this end, plug 16 is threaded into the eye of the knuckle and has a reduced tapered inner end 44 with a wedge fit in a corresponding recess in the king pin. The plug has an integral axial stud 45 thereon, about which is fitted an eye 46, formed as an integral part of the dividing fitting, said eye clamped in position by a nut 47, threaded upon the extreme end of the stud and locked by a washer 48. The lubricant from the king pin bore 36 emerges through an axial bore 49 in the plug which, in turn, delivers through a radial bore 50 in the stud 45 to a peripheral groove 51 thereabout, that drains to the pipe 38, in the dividing fitting. By the construction described, it will be seen that the plug 16 performs the triple function of locking the king pin in the knuckle, affording a mount for the head of the piping system on the knuckle and affording a tight passage for the lubricant between the king pin bore and the piping system.

The knuckle piping system need not be described in detail, as it may be similar to that of my copending application above referred to. It may be simply noted that the pipe 42 leading to the tie rod delivers inward through a radial bore $a$ which, in turn, delivers to an axial bore $b$ in the pivot stud plugged at its outer end at $b'$ and emitting lubricant through radial bores in the ball stud at $c$. The bores in the drag link stud may be similarly arranged, but are not shown.

The king pin is provided with a flat 52 extending the entire length thereof, affording a restricted passage through which some of the lubricant in the well 33 may flow downward and collect in the cavity 22′ below the king pin and spread upward into the lower king pin bushing 14. The thrust bearing 17 is lubricated through a radial bore 53 communicating with axial bore 36 and at the level of the ball bearing.

In operation, lubricant from the drip plug 28 delivered to the well 33 will flow downward in part to the upper bushing 13, but largely through the bore 36 in the king pin, from which some enters the ball bearing 17 and the rest passes through the plug bore 49 into the dividing fitting 37 from which the tie rod and drag link bearings are supplied. A part of the lubricant is intercepted at the flat 52 of the king pin and delivered to the lower king pin bushing 14.

Figures 4, 5:
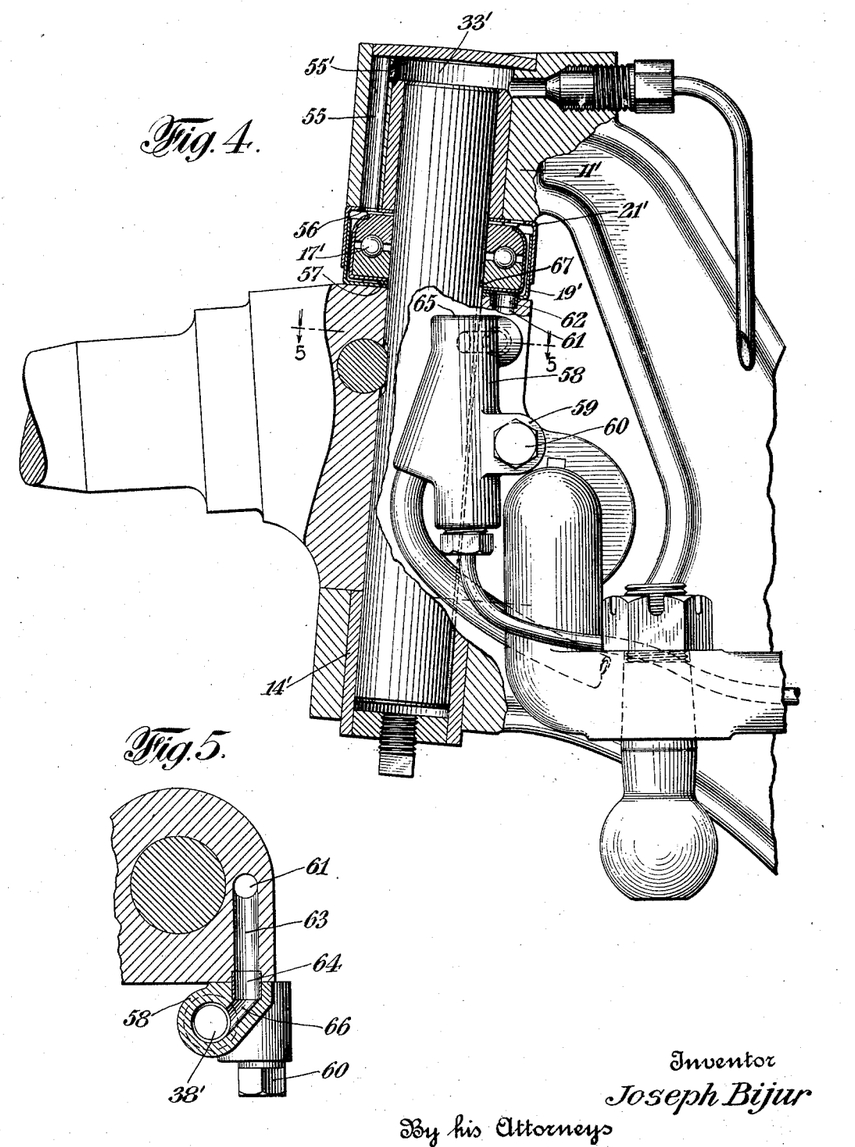
Fig. 4 is a view similar to Fig. 1 of another embodiment.
Fig. 5 is a detail sectional view thereof taken along the line 5—5 of Fig. 4.

In Figs. 4 and 5 is shown a construction generally similar to that just described, differing therefrom essentially in delivering the lubricant to the piping system through a course independent of the king pin and in which, moreover, the dividing fitting is mounted for deriving its lubricant from the thrust bearing 17′. For this purpose, the upper knuckle clevis jaw 11′ has a longitudinal bore 55 supplied from the well 33′ by an inlet port 55′ and draining through an aperture 56 in the cover 21′ of the thrust bearing to lubricate the same. A star washer 57 is interposed in this construction between the ball race assembly 17′ and an enclosing capsule 19′, which in this case rests directly upon the knuckle rather than in a special socket therefor. For mounting the dividing fitting 58 I provide an integral lateral lug 59 thereon similar to the construction of my copending application above referred to, which is bolted as at 60 to the knuckle. For leading lubricant from the thrust bearing structure into the dividing fitting, the knuckle has a bore 61 therein extending downward from the upper face thereof, a bushing 62 fitted thereinto and into the thrust bearing capsule 19′ maintaining the lower or cup member of said capsule rigid with the knuckle and admitting lubricant without leak to the bore 61 from the thrust bearing. The bore 61 communicates with a horizontal bore 63 in the knuckle, the metal being machined flat at the outlet end of said bore for lubricant-tight face fit thereagainst of a correspondingly flat face on the dividing fitting 58. A short length of tubing 64 is press-fitted into the knuckle and the dividing fitting and extends across the contacting faces thereof as a further safeguard against leak of lubricant. As shown, the dividing fitting 58 is closed as at 65 at its upper end and has an oblique passage 66 delivering the lubricant from knuckle bore 63 into the main bore 38′ of said fitting. In the present embodiment, the king pin is provided with flat 67 extending downward from the lower face of the thrust bearing to supply the lower king pin bushing 14′.

Figures 6, 7:
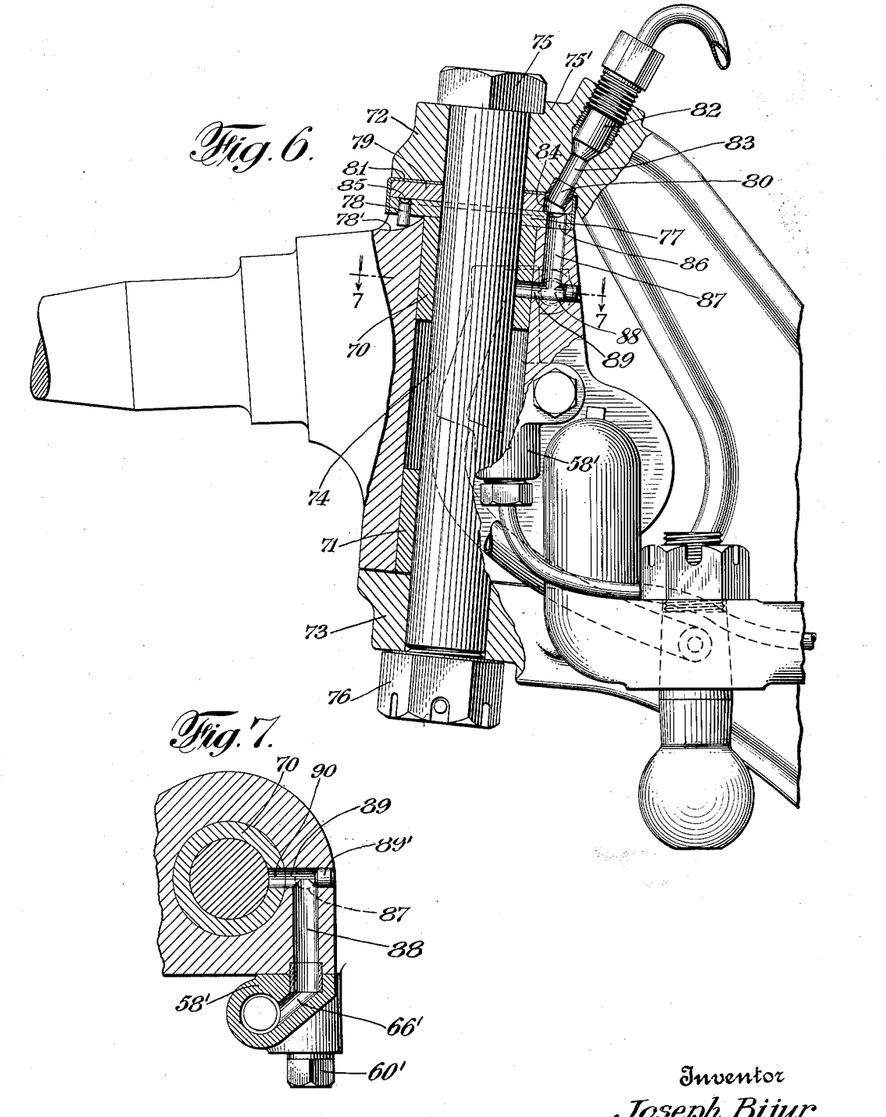
Fig. 6 is a view similar to Fig. 1 of a further embodiment.
Fig. 7 is a sectional view taken along the line 7—7 of Fig. 6.

The embodiment of Figs. 6 and 7 is concerned with a knuckle of type in which the bearing bushings 70 and 71 are provided within the knuckle bore, which is straddled by jaws 72 and 73 of the axle clevis. The king pin 74 has a head 75 retained by shoulder 75′ on the upper axle clevis jaw against rotation, a nut 76 on the lower threaded end of the king pin securing the same in position. The thrust bearing in this case, is shown comprising a pair of thrust washers, the lower 77 of which rests on the knuckle and has a locking pin 78 therethrough fitting in a corresponding notch 78′ on the knuckle. The upper thrust washer 79 is maintained locked rigid with the knuckle by a locking member 80 which in this case also permits entry of the lubricant to the knuckle, as will be described below. The trust bearing is rendered substantially dust-proof by the downwardly extending flange of a sheet metal enclosing cap 81, clamped in position between the upper thrust washer 79 and the upper clevis jaw 72. A drip plug 82 is fitted in a corresponding socket formed integral with the upper end of the axle clevis jaw and delivers through an oblique port 83, past an oblique length of piping 80, press-fitted into the axle and extending obliquely into a corresponding aperture 84 in the upper thrust washer, to key the same against rotation. The lower thrust washer is provided with a concentric groove 85 in its bearing face, draining through an aperture 86 therethrough into a vertical bore 87 in the knuckle structure. The vertical bore in turn communicates with a horizontal bore 88 and affords admission to a dividing fitting 58′ constructed in manner identical with that described in connection with Figs. 4 and 5, and which need not be again described, corresponding parts being designated by the same reference numerals primed. In this embodiment, lubricant is passed to the upper bushing 70 from the bore 87 through corresponding bore 89 transversely through the knuckle, plugged at 89′ at its outer end, and delivering into a bore 90 registering therewith in bushing 70.

In operation, lubricant admitted through the drip plug 82 will flow through port 83 and tube 80 into aperture 84 in the upper thrust member 79 from which part will spread laterally to lubricate said bearing, the rest draining through bores 87 and 88 in the knuckle into the dividing fitting 58′ from which the drag link and tie rod bearings are supplied. Some of the lubricant from passage 87 will spread through port 90 to the upper bushing 70, the excess from which flows downward along the king pin 74 to supply the bearing of the lower bushing 71.

Figures 8, 9, 10, 11:
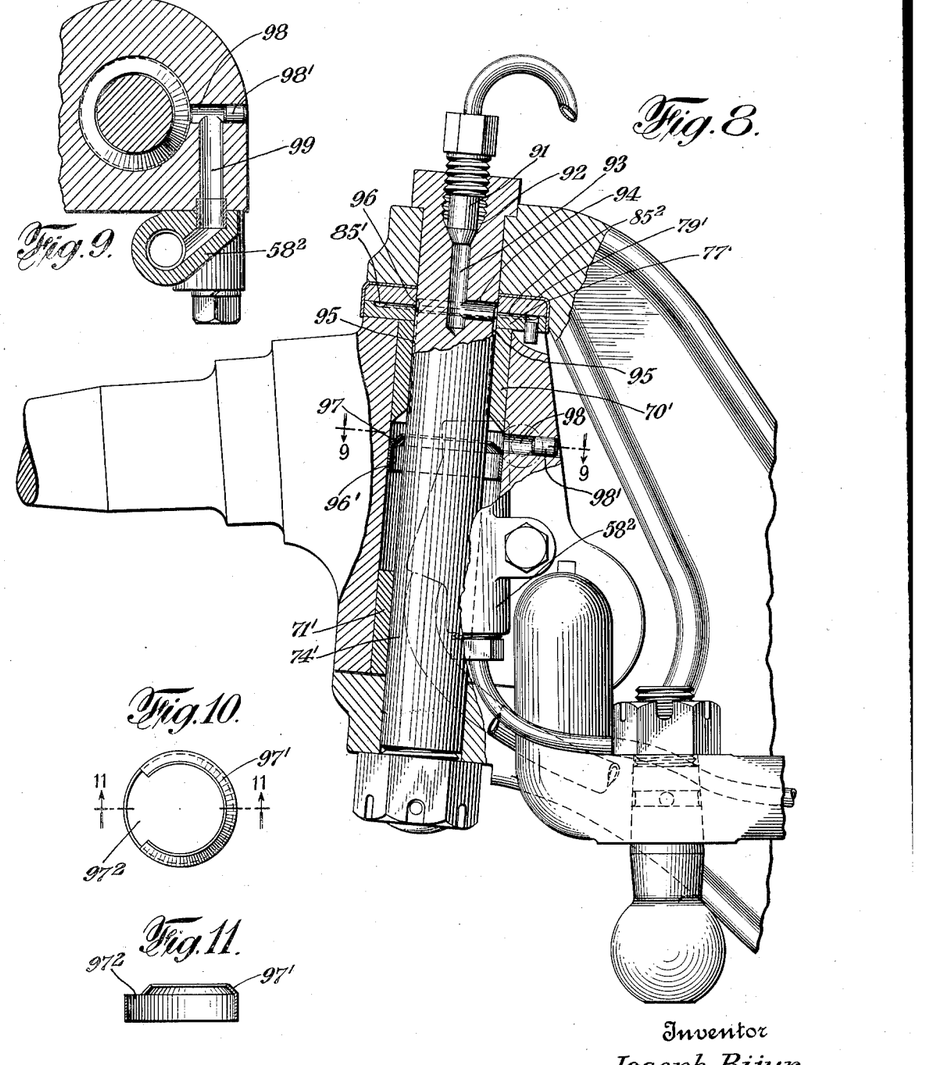
Fig. 8 is a view similar to Fig. 1 of a further embodiment.
Fig. 9 is a detail transverse sectional view taken along the line 9—9 of Fig. 8.
Fig. 10 is a plan view of a modified form of baffle.
Fig. 11 is a sectional view thereof taken along the line 11—11 of Fig. 10.

In Figs. 8 and 9 is shown another mode of lubricating a knuckle of the general type shown in Figs. 6 and 7. In this embodiment, I have shown lubricant admitted through a drip plug 91 fitting in a socket 92 in the upper end of king pin 74′. The socket 92 communicates with an axial bore 93 in the king pin which drains through one or more radial bores 94 at the level of the thrust washers 77′—79′ to supply the bearing surface thereof. To assure an adequate supply of lubricant for the thrust bearing, an annular trough 85′ is provided in the bearing surface of washer 77′, in which may be stored lubricant delivered from bore 94 through connecting radial grooves $85^2$. The knuckle bearings are supplied with the bulk of the lubricant from bore 94, through longitudinal grooves 95 along the king pin. To facilitate the division of lubricant between the thrust bearing and said grooves 95, the king pin has a peripheral groove 96 aligned with the thrust bearing, and intersected by said grooves 95. The lubricant will tend to flow from grooves 95 along the downwardly and outwardly beveled lower edge of bushing 70′ to the bore of the knuckle where the lubricant is intercepted by a sheet metal baffle member 96′, press-fitted into the bore of the knuckle between the bushings 70′ and 71′. Baffle 96′ has an inwardly and upwardly beveled rim 97 from which the lubricant drains through a horizontal bore 98 in the knuckle plugged at its outer end 98′, said bore in turn delivering through a communicating bore 99 at right angles thereto, with the dividing fitting $58^2$ constructed and arranged in manner identical with that of the embodiment of Figs. 5 and 6. The inner edge of the beveled rim 97 affords small clearance about the king pin and permits some of the lubricant that has passed through the grooves 95 to proceed along the king pin and supply the bearing surface of the lower bushing 71′.

In Figs. 10 and 11, is shown a modified form of baffle member differing from that heretofore described merely in the elimination of a segment as at $97^2$ of the beveled rim 97′, so that, as may be desirable in certain cases, a larger proportion of the lubricant will pass to the lower bushing than in the construction shown in Figs. 8 and 9.

Figures 12, 13:
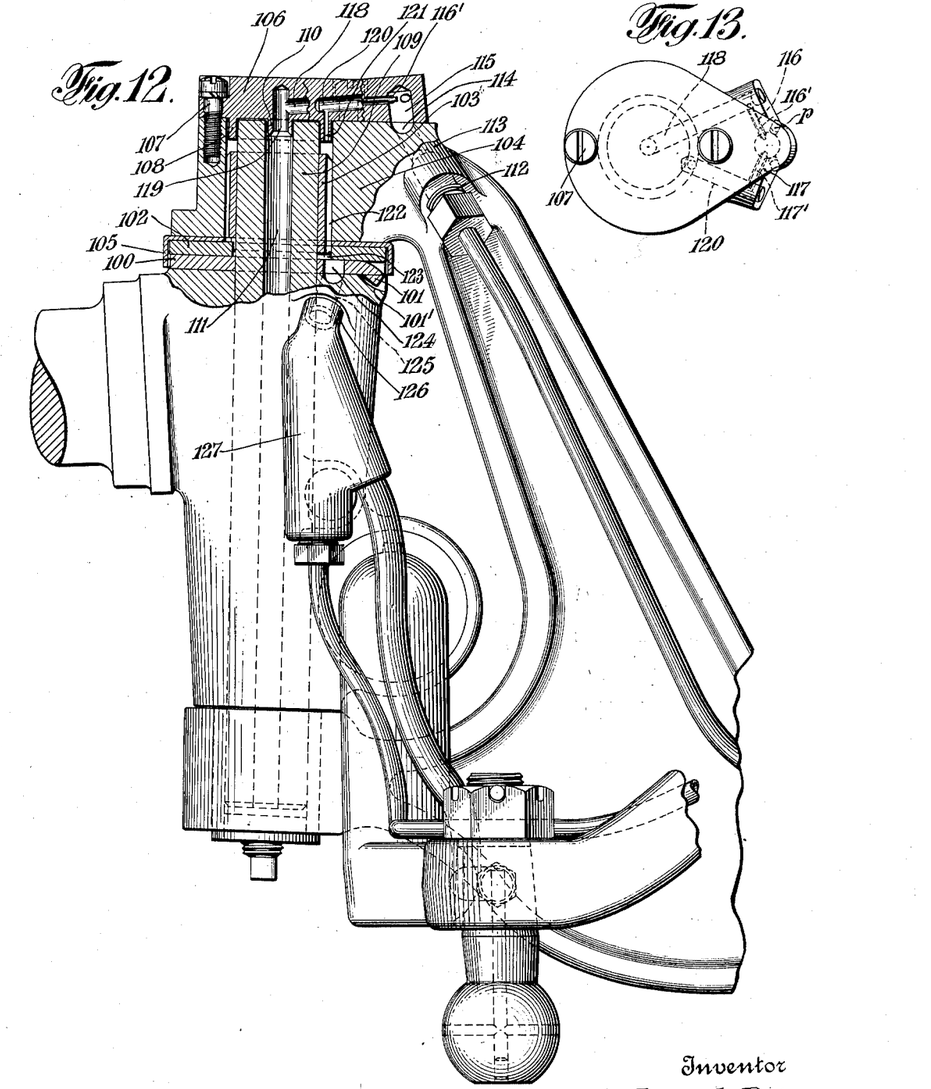
Fig. 12 is a view similar to Fig. 1 of a further embodiment.
Fig. 13 is a plan view of the cap of Fig. 12.

In Figs. 12 and 13, is shown another embodiment applied to a knuckle of the general type shown in Figs. 1 to 5, but illustratively shown provided, in lieu of the ball thrust bearing member, with a thrust bearing formed of a pair of washers, the lower 100 of which is keyed to the knuckle by a downstruck tongue 101 extending into a corresponding depression 101′ in the upper face of the knuckle. The upper washer 102 is friction-fitted about the protruding lower end of the upper bushing 103, which, in turn, is friction-fitted into the upper jaw 104 of the axle clevis. In this embodiment, as in that of Fig. 6, a sheet metal cap 105 is pressed between washer 102 and the upper clevis jaw, and has a downwardly extending skirt or flange to prevent the entry of dirt. The lubricant in the present embodiment, is admitted to the knuckle by a construction and arrangement generally similar to that disclosed in Fig. 3 of my copending application, Serial No. 39,415 filed June 25, 1925. While in that other construction, the upper clevis jaw rotates with the knuckle, rendering desirable the interposition of a dust-tight swivel between the inlet and the clevis jaw, such precaution is eliminated in the application to a stationary clevis, as here disclosed. The cap 106 is secured directly and rigidly to the upper end of the clevis 104 by means of lock screws 107. The cap 106 is provided with a unitary pilot flange 108 extending between the clevis and the upper end of the king pin 109, which as shown, protrudes above the upper end of the bushing 103.

The cap is also provided with a central pilot stud 110 which fits into the upper end of a bore 111 extending axially of the length of the king pin. In this embodiment, I have illustratively shown the inlet fitting 112, also a drip plug, secured in a unitary boss 113 in the axle and delivering through a bore 114 in said axle directly into a cavity 115 in the lower face of the cap, which, being tightly pressed against the upper face of the knuckle affords a lubricant-tight passage. The cavity 115 communicates with a pair of bores 116 and 117 restricted by pins 116' and 117' respectively, passed thereinto from the exterior, and retained against loss by plugs $p$ fitted into the outer ends of said bores. The restricted passage 116 in turn communicates with a downwardly sloping bore 118 communicating with an axial bore 119 in the cap that drains into the king pin bore 111, while passage 117 communicates with a bore 120 also radially of the cap, which drains through a narrow downwardly extending nozzle 121 in the pilot flange 108. The upper bushing 103 is provided with a longitudinal groove 122 through which the lubricant through the nozzle 121 drains by way of recess 123 in the upper washer 102 to the thrust bearing surface between the washers 100 and 102. A port 124 in the lower washer 100 delivers into a short length of pipe 125, press-fitted into a corresponding oblique bore in the knuckle, over the protruding end of which pipe is press-fitted the inlet neck 126 of a dividing fitting 127, similar in construction except for the mode of mounting the same, to the dividing fitting shown in the other embodiments.

The construction and operation of those parts of the embodiments of Figs. 4 to 13 not described in detail, will be readily understood from the description of the corresponding parts of the embodiment of Figs. 1 to 3.

In all of the embodiments disclosed, lubricant propelled under pressure through a pressure-line is advanced past a drip plug affixed to the axle and proceeds substantially without pressure, across one of the swivels between the axle and the knuckle into the knuckle piping system that leads to the bearing or bearings carried by the knuckle.

In all of the embodiments shown, the dust-proofing seal of the swivel or thrust bearing may also exclude air, especially when it is wet with oil, so that the knuckle pipe or conduit system may be unvented. In certain cases to obviate possible consequent defective flow operation, the conduits leading lubricant to the bearing or bearings at lower level may be of relatively large diameter, that is, of ¼" bore or more, sufficiently large to allow the lubricant to flow therethrough about any air therein. I have special reference to pipe 42 in the embodiment of Fig. 1 and the corresponding pipes in the other embodiments. In the embodiment of Fig. 12, lubricant is passed to the lower king pin pivot bearing through a bore 111 which may have a bore of the same magnitude and for the same purpose. In the embodiments of Figs. 6 to 10, the substantial annular area between the two bushings across which lubricant trickles from the upper to the lower is also of cross-sectional area exceeding the minimum mentioned.

By such an arrangement, lubricant admitted to the head of the unvented conduit system will readily flow therethrough to the bearing. There is precluded the effect of trapped air that might block the flow of lubricant and only release the same after a substantial column had collected therein. The provision of the relatively large diameter pipe and bores referred to, also precludes the withdrawal through the lower bearings of lubricant that might otherwise be siphoned from the higher bearings.

In each of the embodiments, as illustratively shown in Fig. 1, the ball pivot stud 27 of the drag link is shown extending upward and has an outlet 27' at substantially the level of the dividing fitting 37. Blocking by air of lubricant admitted into any part of the intervening pipe 40, which extends below outlet 27', is inherently precluded even though as shown, the same be of diameter less than required to pass lubricant about any air therein. The length of pipe below the outlet 27' acts as a lubricant trap and air will not enter thereinto after once the conduit has been fully charged with lubricant.

Stated generically, the piping system on the knuckle when closed against venting may be of bore sufficiently large to permit flow of lubricant about any air therein at all parts thereof above the level of the bearing outlets supplied therefrom. The bores through the pivot ball studs, however, may be of small diameter, as shown in the drawings, regardless whether said studs extend upward or downward.

In certain of the claims, I use the term "control bearing" as applying to one of the bearings of associated with or adjacent to the knuckle. This term includes generically any of the bearings at the knuckle by which a movement of or an operating adjustment on the knuckle or the wheel thereon is effected or transmitted from one to the other knuckle.

It will be understood that the invention is applicable to steering knuckles not connected with the steering gear, that is, to one devoid of a drag link arm and certain of the generic claims apply to such construction.

It will also be understood that while the specific drip plug construction above referred to is preferred as the terminal from which the knuckle bearings are supplied, terminals of other construction may be employed, regardless whether they may be properly designated as drip plugs, provided only they emit the lubricant no faster than it can be accommodated in the knuckle and the bearings thereof.

The control bearings referred to in the accompanying claims, the lubrication of which the present application is particularly adapted, include the pivotal bearings or the upper and lower king pin bearings, the thrust bearing, which also may be a pivotal bearing, the tie rod and drag link bearings and other bearings which may be positioned upon and carried by the knuckle or be located adjacent to the knuckle.

The expression axle has been generally used to include the chassis member pivotally supported by the knuckle and the expression king pin has been used to include generally the pivotal mount of the knuckle upon the axle. In the specific embodiment shown this king pin does not form a part of the axle or the knuckle but is fixed in one and bears in the other.

The present invention also includes the supply of lubricant across other swivel connections than the steering knuckle of an automotive vehicle.

I claim:—

1. A structure including an axle having a clevis, a king pin extending therethrough, a knuckle, said king pin constituting a bearing mount therefor, a dividing fitting rigid with the knuckle and carried thereby, a pipe of relatively large diameter extending downward from one branch thereof to the tie rod bearing, a pipe extending from the other branch along the structure of the drag link arm to supply the bearing thereof, a lubricant inlet carried by a part rigid with the axle, said structure including a dust-tight swivel between the axle and the knuckle, and draining means encircled by the outer periphery of said swivel for conveying lubricant from said inlet to said dividing fitting.

2. In a motor vehicle, in combination, an axle having a clevis, a steering knuckle extending between the jaws of said clevis, a king pin affording a pivot bearing for said knuckle and fitting at its ends into said clevis jaws, an inlet fitting carried by a part rigid with said axle, a fitting carried by the knuckle at a part thereof adjacent the king pin, a pipe leading from said knuckle fitting to a bearing of the knuckle, a conduit for conveying lubricant from the inlet fitting to the knuckle fitting, including a swivel encircling the king pin having an annular part rocking with the knuckle, and a conduit bored into the knuckle, and draining from said annular part to said knuckle fitting.

3. In a steering knuckle, in combination, an axle of the clevis type, a knuckle having a king pin therethrough extending into the jaws of the clevis, bearings carried by said knuckle, a thrust bearing sustaining the axle upon the knuckle, means carried by the axle admitting lubricant for said bearings, said means affording a passage through the thrust bearing structure for lubricating the latter, and a dividing fitting rigid with the knuckle leading lubricant from the thrust bearing to the bearing surfaces carried by the knuckle.

4. In a motor vehicle, in combination, an axle of the clevis type, a knuckle, a king pin therethrough extending into the clevis jaws of said axle, an inlet fitting carried by the upper axle clevis jaw, means affording a gravity flow passage from the inlet fitting to the structure of the knuckle, said means including a substantially leak-proof thrust bearing between the upper clevis jaw and the knuckle, and a conduit along the knuckle leading the lubricant that has passed the thrust bearing from the bottom thereof, to a bearing carried by the knuckle.

5. In a motor vehicle, in combination, an axle having a clevis, a knuckle straddled thereby, a king pin therethrough affording a pivot bearing for said knuckle, means rigid with the upper clevis jaw affording an inlet for lubricant, a thrust bearing resting upon the upper face of said knuckle and carrying the upper clevis jaw, a draining passage through the upper face of the knuckle structure and supplied with lubricant drained from the bottom of the thrust bearing, and a conduit system carried by the knuckle delivering the lubricant admitted to said draining passage onward to a bearing carried by the knuckle.

6. In a motor vehicle, in combination, an axle clevis, a knuckle, a king pin through said knuckle and said clevis and affording a pivot bearing for the former, a thrust bearing interposed between the knuckle and the upper clevis jaw, an inlet fitting carried by the upper clevis jaw, a passage through said clevis jaw, extending downward to one side of the king pin and delivering into the upper face of the thrust bearing, a passage in the knuckle draining the lower face of the thrust bearing, and a conduit system carried by the knuckle delivering the lubricant from said draining passage onward to one or more bearings carried by the knuckle.

7. The combination set forth in claim 6 in which the thrust bearing includes a substantially dust-proof enclosure and in which the conduit system has voids sufficiently large to prevent the formation of a vacuum therein, whereby only clean lubricant will be passed to the knuckle bearing, and the flow will occur promptly.

8. In a motor vehicle, in combination, an axle clevis, a knuckle extending between the jaws thereof and having a pivot bearing with respect thereto, a thrust bearing sustaining the axle upon the knuckle, a lubricant inlet carried by the axle, and a passageway through a part rigid with said axle, and delivering lubricant from said inlet by gravity flow to said thrust bearing, said thrust bearing having a part therethrough leading to a bore in said knuckle and a dividing fitting carried by said knuckle and supplied from said bore, said fitting having one branch leading along the drag link arm to the corresponding bearing and another branch leading to the tie rod bearing.

9. In a motor vehicle, in combination, an axle clevis, a knuckle extending between the jaws thereof and having a king pin therethrough affording a bearing therefor, a thrust bearing encircling the king pin and interposed between the knuckle and the upper clevis jaw, a lubricant inlet carried by the upper clevis jaw, a passage longitudinally of the upper clevis jaw, draining lubricant from said inlet into the upper face of the thrust bearing, a passage laterally of the king pin and in the knuckle, draining from the lower face of the thrust bearing and a dividing fitting carried by the knuckle communicating with said knuckle bore and having one branch leading along the drag link arm to the corresponding bearing and another branch pipe leading to the tie rod bearing.

10. In a motor vehicle, in combination, an axle, a knuckle, a pivot mount for the latter in the former, a thrust bearing interposed between the upper end of the knuckle and a part of the axle, a bearing associated with the knuckle and at a level lower than the thrust bearing, means for lubricating said thrust bearing and said other bearing, said means comprising a lubricant inlet carried by the axle near the upper part thereof, a passage through the axle draining across the thrust bearing, an aperture through the lower bearing member of the thrust bearing, draining lubricant from the latter, and a conduit carried by the knuckle conveying said drained lubricant to said bearing.

11. In a motor vehicle, in combination, an axle, a knuckle, a king pin affording a pivot mount for said knuckle in said axle, a thrust bearing interposed between the upper end of said knuckle and said axle, means excluding dust from said thrust bearing, a drag link bearing and a tie rod bearing carried by said knuckle and at a level lower than said thrust bearing, means carried by the axle delivering lubricant to said thrust bearing, a bore in the upper face of the knuckle supplied from an aperture through the lower thrust bearing member and a conduit system supplied from said bore, said system including a dividing fitting carried by the knuckle, a pipe extending from one branch thereof to the tie rod bearing and another pipe extending from another branch thereof to the drag link bearing.

12. In combination with a motor vehicle having an axle having a clevis, a knuckle extending between the jaws of said clevis, a king pin affording a pivot mount for said knuckle and extending through the clevis jaws and a thrust bearing composed of a pair of washers interposed between the knuckle and the upper clevis jaw and encircling the king pin; a lubricant installation for bearings associated with the knuckle comprising a lubricant inlet fitting carried by the upper clevis jaw, a longitudinal passage rigid with said clevis jaw and communicating with said fitting, an aperture in said upper washer communicating with said passage, an aperture in said lower washer draining said thrust bearing and a piping system carried by the knuckle and in direct communication with said lower aperture, said piping system extending along the structure of the knuckle to one or more of said bearings and supplying lubricant thereto.

13. In combination with a steering knuckle arrangement having an axle eye, a knuckle, a king pin therethrough extending into said eye, a thrust bearing between said knuckle and said eye composed of a pair of thrust washers and means keying the lower of said washers to said knuckle; a lubricating installation for a bearing or bearings associated with the knuckle comprising a lubricant inlet carried by the eye, a duct in a part of the structure rigid with said eye draining lubricant to the thrust bearing surface, an aperture in the lower washer of the thrust bearing, a bore in the knuckle structure receiving lubricant therefrom and a piping system carried by the knuckle conveying said lubricant onward to the bearing or bearings thereof.

14. In combination with a motor vehicle having an axle clevis, a knuckle straddled thereby, a king pin rigid in said knuckle and bearing in the jaws of said clevis, a thrust bearing interposed between said knuckle and the upper clevis jaw and a bushing fixed in said clevis jaw affording a bearing for the upper end of the king pin, a lubricating installation for bearings associated with said knuckle comprising an inlet carried by a part rigid with the axle, a bore extending parallel to the king pin axis through a part rigid with the upper clevis jaw and delivering to said thrust bearing, a bore in the upper face of the knuckle receiving lubricant from said thrust bearing and a piping system carried by the knuckle and supplied from said bore.

15. In a motor vehicle, in combination, an axle having a clevis, a knuckle straddled thereby, a king pin therein having bearings in the jaws of said clevis, a lubricant inlet carried by said axle at a part near the upper end thereof and a downwardly extending vertical bore extending downward from the upper face of the knuckle, draining lubricant from said inlet and communicating with a horizontal bore in said knuckle and at the upper part thereof, and a piping system carried by said knuckle intercepting the lubricant from said horizontal bore and extending generally downward along said knuckle to the bearing or bearings thereof.

16. In combination with a motor vehicle, an axle, a knuckle, a king pin affording a pivot mount for said knuckle, a thrust bearing encircling said king pin and interposed between said knuckle and said axle and a control bearing member rigid with said knuckle; means for lubricating said thrust and control bearing in parallel comprising an axial bore in the upper end of the king pin, a conduit supplied therefrom carried by the knuckle and leading to said control bearing and a radial bore in said king pin communicating with said axial bore and at the level of said thrust bearing to supply the latter with lubricant.

17. A steering knuckle of the type having an upper thrust bearing face, a fitting clamped against said knuckle and in registry with a port at the clamping face thereof, a bore in said knuckle terminating at the upper thrust bearing face thereof through which lubricant is supplied to said port and a pipe communicating with an outlet of said fitting and leading to the tie rod bearing.

18. In a motor vehicle, in combination, a knuckle including a tie rod bearing at lower level, and a drag link bearing at higher level, a piping system for supplying said bearings, said system including a dividing fitting clamped against the knuckle, a pipe extending along the structure of said knuckle to supply the drag link bearing, and a pipe connecting the other outlet of the dividing fitting to the tie rod bearing, and means for supplying lubricant to said dividing fitting comprising a downward bore from the thrust bearing face of the knuckle, and an outward bore supplied therefrom and extending transversely through the clamped face of the dividing fitting.

19. In combination with a motor vehicle, an axle clevis, bearing bushings press-fitted in the jaws thereof, a knuckle and a king pin rigid with said knuckle and bearing in said bushings, a lubricating installation for one or more bearings associated with said knuckle comprising a lubricant inlet on said axle, a bore extending axially from the upper end of said king pin partway therethrough to drain lubricant from the inlet, and a conduit carried by the knuckle and extending along the structure thereof to one of said bearings, the inlet end of said conduit extending laterally into said king pin to drain lubricant from said bore.

20. In combination with a motor vehicle, an axle clevis, a knuckle straddled by the jaws thereof and a king pin therein extending into the jaws of said clevis and affording bearings for said knuckle; a lubricating installation for one or more bearings associated with said knuckle comprising a lubricant inlet carried by a part rigid with the axle, passages delivering lubricant therefrom in parallel to the lower king pin bearing and to one or more of the other of said bearings and restriction dividing means determining the division of the lubricant between said passages from said inlet.

21. In combination with a knuckle arrangement, an axle eye, a bushing fixed in said eye, a knuckle below said eye having a pivot stud extending into said eye and a thrust bearing between the knuckle and said eye; a lubricating installation for one or more bearings associated with said knuckle comprising a lubricant inlet carried by said eye, a longitudinal groove in the outside of said bushing for draining lubricant from said inlet to the bearing surface of said thrust bearing, a conduit system carried by the knuckle leading to one of said bearings and a passage to said system from below the thrust bearing for draining lubricant therefrom.

22. In combination with a motor vehicle having an axle clevis, a knuckle between the jaws of said clevis, a king pin therethrough protruding into and bearing with the jaws of said clevis, a thrust bearing interposed between the knuckle and the upper clevis jaw and a bushing press-fitted into said clevis jaw; a lubricating installation for one or more associated bearings associated with said knuckle comprising a pair of separated small longitudinal grooves in said bushing communicating with the bearing surface of the thrust bearing, a lubricant inlet carried by the axle and delivering to one of said grooves, a transverse passage establishing communication between the bottoms of said two grooves and a bore in the knuckle draining said thrust bearing.

23. In a steering knuckle arrangement, in combination, an axle eye, a knuckle, a king pin rigid therewith, a bushing press-fitted into said eye to afford a bearing for the king pin and a thrust bearing sustaining the axle upon the knuckle including a disk immovably fitted upon a part of the bushing and a second coacting disk keyed to the contiguous part of the knuckle and a lubricant conduit system including an inlet on the axle, a longitudinal groove on the outside of the bushing and registering notches in the disks directly below the outlet of said groove conducting lubricant from said axle to said knuckle.

24. In a steering knuckle arrangement, in combination, an axle eye, a knuckle, a king pin rigid therewith, a bushing press-fitted into said eye to afford a bearing for the king pin and a thust bearing sustaining the axle upon the knuckle, including a disk press-fitted upon a part of the bushing, a second coating disk keyed to the contiguous part of the knuckle and a sheet metal cap pressed against the eye by the first mentioned disk and having a downwardly directed skirt extending beyond the thrust bearing face and a lubricant conduit system including an inlet on the axle, a longitudinal groove on the outside of the bushing and registering notches in the disks directly below the outlet of said groove conducting lubricant from said axle to said knuckle.

25. In combination with a motor vehicle having an axle and a knuckle, said knuckle having a pivot mount with respect to the axle; a lubricating installation for one or more bearings associated with said knuckle comprising a lubricant inlet structure for supplying said knuckle and fixed to the upper part of the axle above the knuckle and control means associated with said structure dividing lubricant admitted thereto in a predetermined ratio amongst said bearings.

26. In combination with a motor vehicle having a clevised axle, a knuckle straddled thereby and a king pin through said knuckle bearing in the jaws of said clevis; a lubricating installation for one or more bearings associated with said knuckle comprising a cap fixed to the upper end of the clevis, a lubricant inlet fitting admitting lubricant to said cap, an axial king pin bore, a pair of flow controlling passages through said cap, one draining into said axial bore and the other to the upper pivot bearing of said king pin and a conduit system carried by said knuckle draining excess lubricant from said upper bearing for supplying other of said bearings.

27. In combination with a motor vehicle having a clevised axle, a knuckle straddled thereby, a king pin fixed therein, bushings in the jaws of said clevis constituting pivot bearings for the ends of said king pin and a thrust bearing upon the knuckle sustaining the upper axle clevis jaw; a lubricating installation for one or more bearings associated with said knuckle comprising a cap secured to the upper end of the clevis with a plurality of bores and with a pilot flange protruding into the space about the king pin and above the upper bushing, a lubricant inlet rigid with the axle admitting lubricant into said bores, an axial bore through the length of the king pin from which the lower bearing thereof derives lubricant receiving lubricant from one of said cap bores and a longitudinal groove on the exterior of the upper bushing receiving lubricant from another of said bores and supplying said thrust bearing.

28. In apparatus of the character described, in combination, a knuckle having a king pin therein, an upper clevis jaw into which said king pin extends and a ball thrust bearing interposed between said clevis jaw and said knuckle, said thrust bearing having an enclosing swivelling capsule for excluding dust therefrom, a lubricant inlet fitting carried by the upper clevis jaw and delivering into a well communicating with the king pin bearing, a draining bore through said clevis jaw parallel to the king pin and delivering through a corresponding aperture in the swivel capsule into the thrust bearing, a bore in the corresponding face of the knuckle, draining lubricant from said thrust bearing into the structure of the knuckle, and a piping system carried by the knuckle delivering lubricant from the draining bore to the bearing or bearings requiring lubrication.

29. As an article of manufacture, a steering knuckle to be pivoted at an axle clevis said knuckle carrying a drag link arm and a tie rod arm, a dividing fitting secured to said knuckle, a passage bored through parts rigid with the knuckle from an upper face thereof downward to the inlet of said dividing fitting, and a pair of pipes connecting the branches of said dividing fitting to the tie rod and the drag link bearings, all parts of said piping system above the level of the tie rod and drag link outlets being of bore sufficiently large to permit flow of lubricant about any air therein, whereby airblocking and siphoning will be precluded when the knuckle is associated with the axle in a manner to preclude venting thereof.

30. In combination with a motor vehicle, having a clevised axle, a knuckle and a king pin through said knuckle bearing in the jaws of the axle clevis; a lubricating installation for one or more bearings associated with said knuckle comprising a bore in the king pin, a lubricant conveying key communicating with said bore and locking said king pin in said knuckle and a conduit supplied from a lubricant passage in said key and leading to one of said bearings.

31. In combination with a motor vehicle having a clevised axle, a knuckle straddled by said clevis and a king pin bearing in said axle and means locking said king pin to said knuckle including a plug fixed in said knuckle and having a beveled extension wedged into a corresponding depression in the lateral face of the king pin; a lubricating installation for one or more bearings associated with said knuckle comprising a bore in said plug, a pipe connected to said bore and extending along the structure of said knuckle to one of said bearings and a bore through said king pin for supplying lubricant to said plug bore for supply to the pipe.

32. In combination with a motor vehicle having an axle clevis, a knuckle between the jaws thereof, a king pin through said knuckle having bearings in the jaws of said clevis and a pin transversely through said knuckle and extending into a corresponding cavity in said king pin to lock the same with respect to said knuckle; a lubricating installation for one or more bearings associated with said knuckle comprising an axial bore in said king pin for delivering lubricant through the upper end thereof, an axial bore in said locking pin for intercepting the lubricant from said king pin, an eye member encircling the outer end of said locking pin and intercepting the lubricant therefrom and a pipe connected to said eye and conveying said lubricant to one of said bearings.

33. As an article of manufacture, an assembly including a knuckle, an axially bored king pin therethrough and a transverse locking pin in the knuckle having a beveled inner end fitting in a corresponding cavity in the king pin, said pin having a reduced stud at the outer end of said pin for mounting one end of a piping system to be carried by the knuckle, an axial bore therein and a radial bore in the reduced stud communicating therewith, the axial bore in the king pin draining into the axial bore of said locking pin.

34. In a steering knuckle, a piping system carried thereby, a king pin having a passage therethrough leading to said piping system, and common means for affording communication from said king pin bore to said piping system, for mounting one end of said piping system and for locking the king pin in the knuckle.

35. In combination with a motor vehicle, a clevised axle, a knuckle between the jaws of said clevis, a king pin through said knuckle bearing in said clevis jaws, and a thrust bearing interposed between the upper end of the knuckle and the upper clevis jaw; a lubricating installation for one or more bearings associated with said knuckle comprising an inlet in said upper jaw, a well at the upper end of said jaw receiving lubricant therefrom, an axial bore in said king pin draining said well, a radial bore through said king pin delivering part of said drained lubricant to the thrust bearing surface, a piping system carried by the knuckle and a sustaining pin for the inlet end of said piping system, said pin having a bore supplied from the king pin bore and feeding the piping, and extending with an oil tight fit laterally into said king pin, thereby locking the same in the knuckle.

36. In a motor vehicle, in combination, an axle having a clevis, a knuckle, a bearing stud for the upper end of said knuckle, a thrust bearing interposed between the knuckle and the upper clevis jaw, an inlet fitting carried by the upper clevis jaw, a passage through said clevis jaw, extending downward at one side of the bearing stud and delivering into the thrust bearing, a draining passage in the knuckle communicating with the thrust bearing, and a conduit system carried by the knuckle delivering the lubricant from said draining passage onward to one or more bearings carried by the knuckle.

37. In combination with a motor vehicle having an axle, a knuckle, and a king pin affording a pivot mount for said knuckle; a lubricating installation for one or more bearings associated with said knuckle comprising a bore in said king pin, a lubricant conveying pipe and means establishing communication between said pipe and said king pin bore including a plug having a wedging lubricant-tight fit with respect to a part of said king pin.

38. In combination with a motor vehicle having an axle, a knuckle, one having a clevis straddling the other and a king pin affording a pivot mount for said knuckle at said axle; a lubricating installation for one or more bearings associated with said knuckle comprising a bore in said king pin, a lubricant conveying pipe and a terminal effecting a lubricant-tight connection between said pipe and said bore, said terminal including a screw plug, threaded into the straddled structure, with a tapered end wedged into a corresponding depression in the king pin, thereby locking said king pin in position and with mounting means for attachment of said pipe.

39. In combination with a motor vehicle having a clevised axle and a knuckle having a king pin fixed therein with its protruding ends bearing in the jaws of said clevis; a lubricating installation for one or more bearings associated with said knuckle comprising a lubricant inlet carried by the upper clevis jaw, a longitudinal bore through said king pin draining lubricant from said inlet, a pipe draining lubricant from said king pin bore and leading to one of said bearings, a bored plug fixed in said knuckle and having a wedge fit in said king pin and a terminal for said pipe carried by said plug.

40. In combination with a motor vehicle, a clevised axle, a knuckle straddled thereby, a king pin fixed therein and bearing in the jaws of said clevis; a lubricating installation for one or more bearings associated with said knuckle comprising a lubricant inlet, a bore through the length of said king pin supplied therefrom, a lubricant cavity in the lower clevis jaw receiving lubricant therefrom, a passage longitudinally of the upper clevis jaw also supplied from said inlet and another passage carried by the knuckle supplied from said clevis passage.

41. In combination with a motor vehicle. a clevised axle, a knuckle straddled thereby. a king pin fixed therein and bearing in said clevis and a thrust bearing between said axle and knuckle; a lubricating installation for one or more bearings associated with said knuckle comprising a lubricant inlet, a bore through the length of said king pin receiving lubricant therefrom, a lubricant cavity in the lower part of the clevis, a passage longitudinally of the upper part of the clevis, another passage carried by the knuckle supplied from said clevis passage across said thrust bearing and means encircling said thrust bearing to exclude dust from the course of lubricant flow thereacross.

42. In a motor vehicle, in combination, an axle clevis, a knuckle extending between the jaws thereof and having a pivot bearing with respect thereto, a thrust bearing sustaining the axle upon the knuckle, a lubricant inlet carried by the axle, and a passageway delivering lubricant from said inlet by gravity flow to said thrust bearing and to a bore in said knuckle and a dividing fitting carried by said knuckle and supplied from said bore, said fitting having one branch leading along the drag link arm to the corresponding bearing and another branch leading to the tie rod bearing.

43. In a knuckle construction of the type including an axle having a clevis, a knuckle therebetween, a king pin in said axle clevis and having bearing surfaces to mount the knuckle relative to the axle, and in which the knuckle has a tie rod arm; the combination therewith of means for lubricating the various knuckle bearings from a single point, said means including an inlet fitting carried by a part rigid with the axle and near the upper clevis jaw thereof, means conveying lubricant from said inlet fitting past one of the king pin bearing surfaces, to lubricate the latter, a bore in the knuckle intercepting lubricant from said bearing surface, and a piping system carried by the knuckle communicating with said bore to deliver the lubricant therefrom to the tie rod bearing.

44. As an article of manufacture, a steering knuckle to be pivoted at an axle clevis said knuckle carrying a drag link arm and a tie rod arm, an inlet rigid with the clevis, a dividing fitting secured to said knuckle, said inlet being positioned above said knuckle and said fitting, a passage bored through parts rigid with the knuckle from said inlet downward to the inlet of said dividing fitting, and a pair of pipes connecting the branches of said dividing fitting to the tie rod and the drag link bearings, all parts of said piping system above the level of the tie rod and drag link outlets being of bore sufficiently large to permit flow of lubricant about any air therein, whereby airblocking and siphoning will be precluded when the knuckle is associated with the axle in a manner to preclude venting thereof.

45. In combination with a motor vehicle, an axle clevis, a knuckle straddled by the jaws thereof and a king pin therein extending into the jaws of said clevis and affording bearings for said knuckle; a lubricating installation for one or more of bearings associated with said knuckle comprising a lubricant inlet carried by a part rigid with the axle, passages delivering lubricant therefrom in parallel to the lower king pin bearing and to one or more of the other of said bearings and dividing means determining the division of the lubricant between said passages from said inlet.

46. In a motor vehicle axle of the type including a clevised axle and, a knuckle provided with an eye positioned between the jaws of said axle clevis, a king pin fixed in the knuckle eye and protruding on either side of said knuckle eye to bear within the jaws of said axle clevis, a thrust bearing between the top of the knuckle and the bottom of the upper clevis jaw and tie rod and drag link bearings carried by said knuckle; a lubricating installation for the upper and lower king pin bearings, for the thrust bearing and for the drag link and tie rod bearings comprising an inlet rigid with the upper clevis jaw and supplying lubricant above the upper end of the king pin, an interior passageway system enclosed by and through the upper clevis, and in the direction of the axis of the king pin conducting lubricant from said inlet to below said clevis jaw and to said thrust bearing, an interior lubricant conduit in the upper portion of the knuckle together with said passageway system, a dividing fitting attached to the outside of the knuckle and receiving lubricant from said knuckle conduit, external piping extending along the outside of said knuckle to said tie rod and drag link bearings, the conduit leading to the tie rod bearing being of sufficiently wide bore to permit of the reverse flow of air and lubricant, said lower king pin bearing being supplied by lubricant passing through said passageway system.

47. A motor vehicle axle of the type having an axle and a knuckle, one of which elements is clevised and the other of which is provided with an eye between the jaws of said clevis, a king pin fixed to one of said elements and having upper and lower bearings within the other of said elements, control bearings carried by said knuckle and a thrust bearing positioned around said king pin; the combination therewith of a lubricating installation for said thrust bearing, a king pin bearing and said control bearings which comprises a lubricant inlet rigid with the axle, lubricant conduits from said lubricant inlet to said thrust bearing and other lubricant conduits from said thrust bearing to said control bearings and to said king pin bearing.

48. A motor vehicle axle of the type having an axle and a knuckle, one of which elements is clevised and the other of which is provided with an eye between the jaws of said clevis, a king pin fixed to one of said elements and having upper and lower bearings within the other of said elements, control bearings carried by said knuckle and a thrust bearing positioned around said king pin; the combination therewith of a lubricating installation for said upper and lower king pin bearings, said thrust bearing and said control bearings comprising a lubricant inlet rigid with the axle, a proportioning arrangement receiving lubricant from said inlet, and distributing it in parallel to said upper and lower king pin bearings, a conduit arrangement for conducting lubricant from said upper king pin bearing to said thrust bearing and from said thrust bearing in parallel to said control bearings.

49. A motor vehicle axle of the type having an axle and a knuckle, one if which elements is clevised and the other of which is provided with an eye embraced by the jaws of said clevis, a king pin fixed in one of said elements and having upper and lower bearings in the other of said elements, and tie rod and drag link bearings carried externally by said knuckle; the combination therewith of a lubricating installation for said upper and lower king pin bearings and said tie rod and drag link bearings comprising an inlet rigid with the axle, a conduit system leading from said inlet to said bearings to be lubricated, and a plurality of proportioning arrangements associated with said conduit system, one proportioning arrangement distributing the lubricant between the upper and lower king pin bearings and the other proportioning arrangement distributing the lubricant between the tie rod and drag link bearings.

50. A motor vehicle axle of the type having an axle and a knuckle, one of which elements is clevised and the other of which is provided with an eye between the jaws of said clevis, a king pin fixed to one of said elements and having upper and lower bearings within the other of said elements, control bearings carried by said knuckle and a thrust bearing positioned around said king pin; the combination therewith of a lubricating installation for the upper and lower king pin bearings, thrust bearing and the control bearings comprising a lubricant inlet rigid with the axle, a receiving chamber above the upper end of the king pin receiving lubricant from said inlet and passages downwardly through the king pin, one of said passages supplying the lower king pin bearing and the other of said passages supplying the thrust bearing and the control bearings, said control bearings being connected to said king pin passageway by means of piping along the outside of the knuckle.

51. A motor vehicle axle of the type having an axle and a knuckle, one of which elements is clevised and the other of which is provided with an eye between the jaws of said clevis, a king pin fixed to one of said elements and having upper and lower bearings within the other of said elements, control bearings carried by said knuckle and a thrust bearing positioned around said king pin; the combination therewith of a lubricating installation for said thrust bearing and for a plurality of other bearings comprising an inlet rigid with the axle lubricant passageways from said inlet to the thrust bearing on one side of the king pin and from the thrust bearing on the opposite side of the king pin to said plurality of other bearings, whereby lubricant flows from said inlet through and across said thrust bearing, and thence to the other bearings.

52. A motor vehicle axle of the type having an axle and a knuckle, one of which elements is clevised and the other of which is provided with an eye between the jaws of said clevis, a king pin fixed to one of said elements and having upper and lower bearings within the other of said elements, control bearings carried by said knuckle and a thrust bearing positioned around said king pin; the combination therewith of a lubricating installation for said upper king pin bearing, for said thrust bearing and for one or more of said other bearings comprising a lubricant inlet rigid with said axle and positioned above and at one side of the king pin, a receiving chamber supplied with lubricant from said inlet, a lubricant conduit on the other side of the king pin receiving lubricant from said chamber and conveying it to the thrust bearing, and a second lubricant conduit receiving lubricant from said thrust bearing on the same side of the king pin as said lubricant inlet and conveying it to said other bearing or bearings.

53. A steering knuckle of the type having an upper thrust bearing face, a fitting clamped against said knuckle and in registry with a port at the clamping face thereof, a bore in said knuckle terminating at the upper thrust bearing face thereof through which lubricant is supplied to said port and a pipe communicating with an outlet of said fitting and leading to the tie rod bearing and a short length of pipe extending across the clamping face between the knuckle and the fitting press-fitted into both of said elements to effect a substantially lubricant-tight connection therebetween.

54. In a motor vehicle, in combination, a knuckle including a tie rod bearing at lower level, and a drag link bearing at higher level, a piping system for supplying said bearings, said system including a dividing fitting clamped against the knuckle, a pipe extending along the structure of said knuckle to supply the drag link bearing, and a pipe connecting the other outlet of the dividing fitting to the tie rod bearing, and means for supplying lubricant to said dividing fitting comprising a downward bore from the thrust bearing face of the knuckle, and an outward bore supplied therefrom and extending transversely through the clamped face of the dividing fitting, the knuckle being mounted between the jaws of an axle clevis, a thrust bearing being interposed between the upper clevis jaw and the knuckle, and the lubricant being admitted through a part rigid with the axle, being delivered direct to the thrust bearing and draining therefrom into the bore in the knuckle.

55. In combination with a motor vehicle having an axle clevis, a knuckle between the jaws thereof, a king pin through said knuckle having bearings in the jaws of said clevis and a pin transversely through said knuckle and extending into a corresponding cavity in said king pin to lock the same with respect to said knuckle; a lubricating installation for one or more bearings associated with said knuckle comprising an axial bore in said king pin for delivering lubricant through the upper end thereof, an axial bore in said locking pin for intercepting the lubricant from said king pin, an eye member encircling the outer end of said locking pin and intercepting the lubricant therefrom and a pipe connected to said eye and conveying said lubricant to one of said bearings, the eye having a dividing outlet, one branch of which leads to one of said bearings and the other branch through an intervening pipe to another of said bearings.

Signed at New York city in the county of New York and State of New York this 10th day of September, A. D. 1925.

JOSEPH BIJUR.